US006973302B2

(12) United States Patent
Asai et al.

(10) Patent No.: US 6,973,302 B2
(45) Date of Patent: Dec. 6, 2005

(54) INFORMATION PROCESSING TERMINAL

(75) Inventors: Masahiro Asai, Kanagawa (JP);
Yoshihiko Owaki, Tokyo (JP);
Kazushige Tsurumi, Kanagawa (JP)

(73) Assignee: Sony Corporation, Tokyo (JP)

( * ) Notice: Subject to any disclaimer, the term of this patent is extended or adjusted under 35 U.S.C. 154(b) by 496 days.

(21) Appl. No.: 10/182,159

(22) PCT Filed: Nov. 28, 2001

(86) PCT No.: PCT/JP01/10368

§ 371 (c)(1),
(2), (4) Date: Jul. 25, 2002

(87) PCT Pub. No.: WO02/44900

PCT Pub. Date: Jun. 6, 2002

(65) Prior Publication Data

US 2003/0003955 A1  Jan. 2, 2003

(30) Foreign Application Priority Data

Nov. 29, 2000 (JP) .............................. 2000-362563

(51) Int. Cl.[7] .............................................. H04M 3/00
(52) U.S. Cl. .................. 455/419; 455/556.1; 717/168; 717/172
(58) Field of Search ............................. 455/419, 430, 455/550.1, 556.1, 556.2, 558; 717/168–178

(56) References Cited

U.S. PATENT DOCUMENTS

| | | | | |
|---|---|---|---|---|
| 5,381,138 A | * | 1/1995 | Stair et al. ................. | 340/7.41 |
| 5,483,465 A | * | 1/1996 | Grube et al. ............... | 340/7.41 |
| 5,887,254 A | * | 3/1999 | Halonen ..................... | 455/419 |
| 6,029,065 A | * | 2/2000 | Shah ........................ | 455/414.4 |
| 6,088,730 A | * | 7/2000 | Kato et al. ................. | 709/227 |
| 6,128,483 A | * | 10/2000 | Doiron et al. .............. | 455/419 |
| 6,202,207 B1 | * | 3/2001 | Donohue .................... | 717/173 |
| 6,324,693 B1 | * | 11/2001 | Brodersen et al. .......... | 717/177 |
| 6,347,398 B1 | * | 2/2002 | Parthasarathy et al. ..... | 717/178 |
| 6,735,625 B1 | * | 5/2004 | Ponna ....................... | 709/223 |
| 2003/0084206 A1 | * | 5/2003 | Floman et al. ............. | 710/1 |

FOREIGN PATENT DOCUMENTS

| | | |
|---|---|---|
| EP | 0 992 900 | 4/2000 |
| JP | 7-160511 | 6/1995 |
| JP | 7-261989 | 10/1995 |
| JP | 8-249163 | 9/1996 |

(Continued)

Primary Examiner—William Trost
Assistant Examiner—James D. Ewart
(74) Attorney, Agent, or Firm—Frommer Lawrence & Haug LLP; William S. Frommer; Thomas F. Presson

(57) ABSTRACT

The present invention relates to an information processing terminal that makes it possible to readily upgrade software of information processing terminals connected by a network. When a control program stored in a display apparatus 5B is upgraded by a control program stored on a memory card 10, an upgrade program for a base station 1 and the control program for display apparatus 5A and 5C read by the display apparatus 5B are transmitted to the base station 1. The base station 1 upgrades a control program stored therein by the upgrade program received by the base station 1, and also transmits the control program for the display apparatus 5A and 5C to the display apparatus 5A and 5C. The display apparatus 5A and 5C each upgrade a control program stored therein by the upgrade program received by the display apparatus 5A and 5C, respectively.

16 Claims, 9 Drawing Sheets

FOREIGN PATENT DOCUMENTS

| | | |
|---|---|---|
| JP | 8-289009 | 11/1996 |
| JP | 9-331579 | 12/1997 |
| JP | 2000-39989 | 2/2000 |
| JP | 2000-137606 | 5/2000 |
| JP | 2000-194542 | 7/2000 |

* cited by examiner

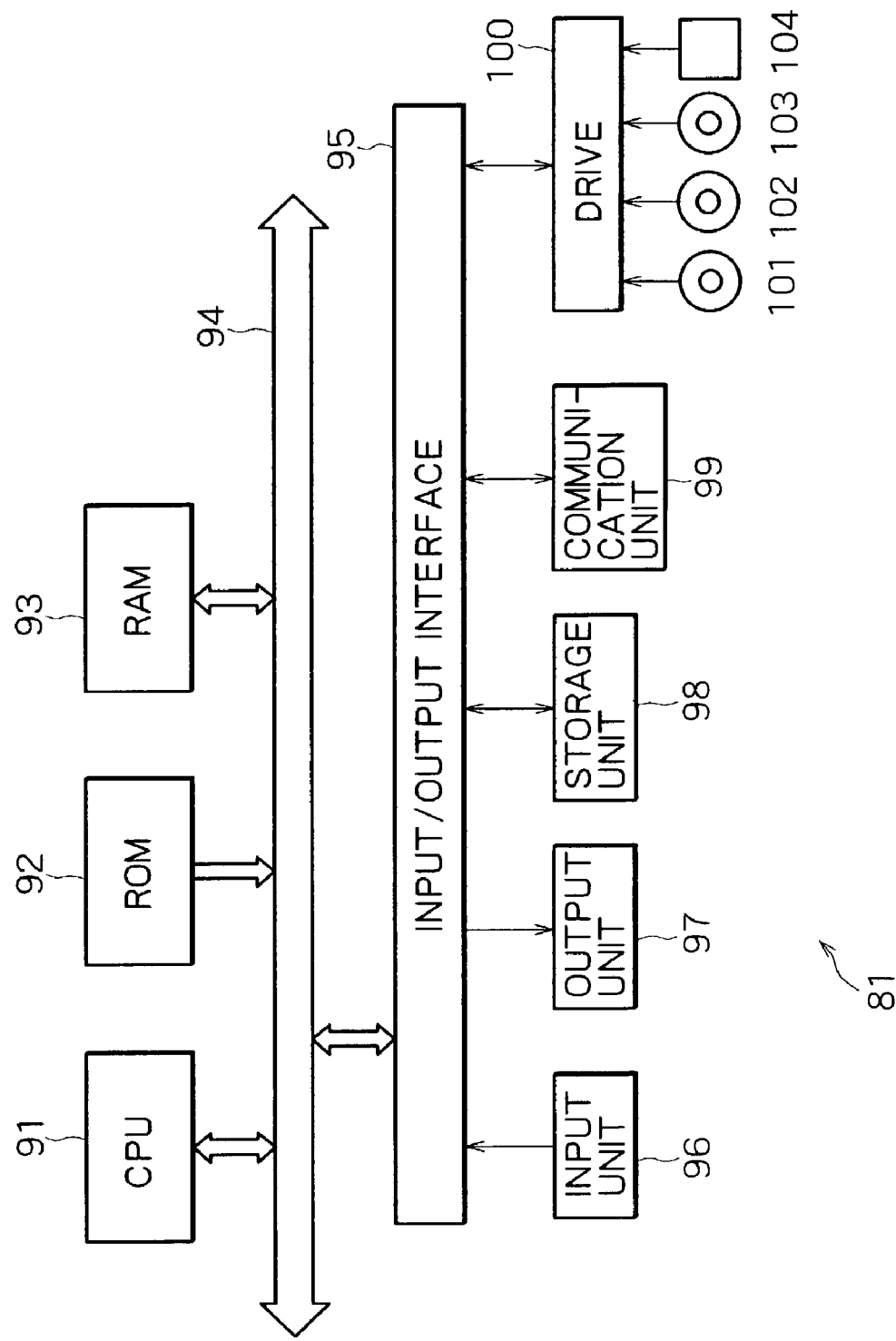

INFORMATION PROCESSING TERMINAL

TECHNICAL FIELD

The present invention relates to an information processing terminal, and particularly to an information processing terminal that makes it possible to readily upgrade a program.

BACKGROUND ART

With the evolution of network technology and information processing terminals such as personal computers, it has recently become possible to connect various information processing terminals by a network even in a home.

These information processing terminals can add various functions thereto by upgrading software being used by the information processing terminals.

However, even with information processing terminals connected to a network constructed in a home, when software is to be upgraded, it is necessary to install software in each of the terminals.

DISCLOSURE OF THE INVENTION

The present invention has been made in view of the above, and it is accordingly an object of the present invention to make it possible to, by upgrading software of one information processing terminal, readily upgrade the software of the other information processing terminals connected by a network.

According to the present invention, there is provided a first information processing terminal characterized by including: communicating means for communicating with an information processing apparatus by radio; storing means for storing a first control program; and control program rewriting means for rewriting the first control program stored by the storing means; wherein the control program rewriting means rewrites the old first control program stored in the storing means on the basis of a new first control program stored on a removable recording medium, and the communicating means transmits a second control program stored on the recording medium to the information processing apparatus to upgrade an old second control program.

The communicating means can transmit to the information processing apparatus the second control program for the information processing apparatus corresponding to the first control program obtained by the rewriting of the control program rewriting means.

The storing means can store a plurality of first control programs, and the control program rewriting means can rewrite only one of the plurality of first control programs.

According to the present invention, there is provided an information processing method of the first information processing terminal, the information processing method characterized by including: a communicating step for communicating with an information processing apparatus by radio; a storing step for storing a first control program; and a control program rewriting step for rewriting the first control program stored by processing of the storing step; wherein processing of the control program rewriting step rewrites the old first control program stored by the processing of the storing step on the basis of a new first control program stored on a removable recording medium, and processing of the communicating step transmits a second control program stored on the recording medium to the information processing apparatus to upgrade an old second control program.

According to the present invention, there is provided a program on a first recording medium, the program characterized by including: a communicating step for communicating with an information processing apparatus by radio; a storing step for storing a first control program; and a control program rewriting step for rewriting the first control program stored by processing of the storing step; wherein processing of the control program rewriting step rewrites the old first control program stored by the processing of the storing step on the basis of a new first control program stored on a removable recording medium, and processing of the communicating step transmits a second control program stored on the recording medium to the information processing apparatus to upgrade an old second control program.

According to the present invention, there is provided a second information processing terminal characterized by including: communicating means for communicating with an information processing apparatus by radio; storing means for storing a control program; and control program rewriting means for rewriting the control program stored by the storing means; wherein the control program rewriting means rewrites the old control program stored by the storing means on the basis of a new control program obtained by the communicating means from the information processing apparatus.

The storing means can store a plurality of control programs, and the control program rewriting means can rewrite only one of the plurality of control programs.

The communicating means can obtain a new control program transmitted from another information processing terminal to the information processing apparatus.

The second information processing terminal can further include rewriting prohibiting means for prohibiting the rewriting of the control program by the control program rewriting means.

According to the present invention, there is provided an information processing method of the second information processing terminal, the information processing method characterized by including: a communicating step for communicating with an information processing apparatus by radio; a storing step for storing a control program; and a control program rewriting step for rewriting the control program stored by processing of the storing step; wherein processing of the control program rewriting step rewrites the old control program stored by the processing of the storing step on the basis of a new control program obtained by processing of the communicating step from the information processing apparatus.

According to the present invention, there is provided a program on a second recording medium, the program characterized by including: a communicating step for communicating with an information processing apparatus by radio; a storing step for storing a control program; and a control program rewriting step for rewriting the control program stored by processing of the storing step; wherein processing of the control program rewriting step rewrites the old control program stored by the processing of the storing step on the basis of a new control program obtained by processing of the communicating step from the information processing apparatus.

According to the present invention, there is provided an information processing apparatus characterized by including: communicating means for communicating with an information processing terminal by radio; storing means for storing a control program; and control program rewriting means for rewriting the control program stored by the storing means on the basis of a control program obtained by the communicating means from the information processing terminal.

When a plurality of information processing terminals are provided, the communicating means can transmit a control program obtained from a first information processing terminal to a second information processing terminal to upgrade a control program of the second information processing terminal.

According to the present invention, there is provided an information processing method of the information processing apparatus, the information processing method characterized by including: a communicating step for communicating with an information processing terminal by radio; a storing step for storing a control program; and a control program rewriting step for rewriting the control program stored by processing of the storing step on the basis of a control program obtained by processing of the communicating step from the information processing terminal.

According to the present invention, there is provided a program on a third recording medium, the program characterized by including: a communicating step for communicating with an information processing terminal by radio; a storing step for storing a control program; and a control program rewriting step for rewriting the control program stored by processing of the storing step on the basis of a control program obtained by processing of the communicating step from the information processing terminal.

According to the present invention, there is provided a first communication system characterized in that: an information processing terminal includes: first communicating means for communicating with an information processing apparatus by radio; first storing means for storing a first control program; and first control program rewriting means for rewriting the first control program stored by the first storing means; wherein the first control program rewriting means rewrites the old first control program stored in the first storing means on the basis of a new first control program stored on a removable recording medium, and the first communicating means transmits a new second control program stored on the recording medium to the information processing apparatus to upgrade an old second control program The first communication system is also characterized in that: the information processing apparatus includes: second communicating means for communicating with the information processing terminal by radio; second storing means for storing the second control program; and second control program rewriting means for rewriting the old second control program stored by the second storing means on the basis of the new second control program obtained by the second communicating means from the information processing terminal.

According to the present invention, there is provided a second communication system characterized in that: an information processing terminal includes: first communicating means for communicating with an information processing apparatus by radio; first storing means for storing a control program; and control program rewriting means for rewriting the control program stored by the first storing means; wherein the control program rewriting means rewrites the old control program stored by the first storing means on the basis of a new control program obtained by the first communicating means from the information processing apparatus. The second communication system is also characterized in that: the information processing apparatus includes second communicating means for communicating with the information processing terminal by radio and transmitting a control program obtained from a first information processing terminal to a second information processing terminal to upgrade a control program of the second information processing terminal.

The first information processing terminal and method, and the program on the first recording medium according to the present invention communicate with an information processing apparatus by radio, store a first control program, and rewrite the stored first control program. The stored old first control program is rewritten on the basis of a new first control program stored on a removable recording medium, and a second control program stored on the recording medium is transmitted to the information processing apparatus to upgrade an old second control program.

The second information processing terminal and method, and the program on the second recording medium according to the present invention communicate with an information processing apparatus by radio, store a control program, and rewrite the stored control program. The stored old control program is rewritten on the basis of a new control program obtained from the information processing apparatus.

The information processing apparatus and method, and the program on the third recording medium according to the present invention communicate with an information processing terminal by radio, store a control program, and rewrite the stored control program on the basis of a control program obtained from the information processing terminal.

The information processing terminal in the first communication system according to the present invention communicates with an information processing apparatus by radio, stores a first control program, and rewrites the stored first control program. The old first control program is rewritten on the basis of a new first control program stored on a removable recording medium, and a new second control program stored on the recording medium is transmitted to the information processing apparatus to upgrade an old second control program. The information processing apparatus communicates with the information processing terminal by radio, stores the second control program, and rewrites the stored old second control program on the basis of the new second control program obtained from the information processing terminal.

The information processing terminal in the second communication system according to the present invention communicates with an information processing apparatus by radio, stores a control program, and rewrites the stored control program. The stored old control program is rewritten on the basis of a new control program obtained from the information processing apparatus. The information processing apparatus communicates with the information processing terminal by radio and transmits a control program obtained from a first information processing terminal to a second information processing terminal to upgrade a control program of the second information processing terminal.

BRIEF DESCRIPTION OF THE DRAWINGS

FIG. 9 is a block diagram showing an example of an internal configuration of a personal computer.

BEST MODE FOR CARRYING OUT THE INVENTION

Figure 1:
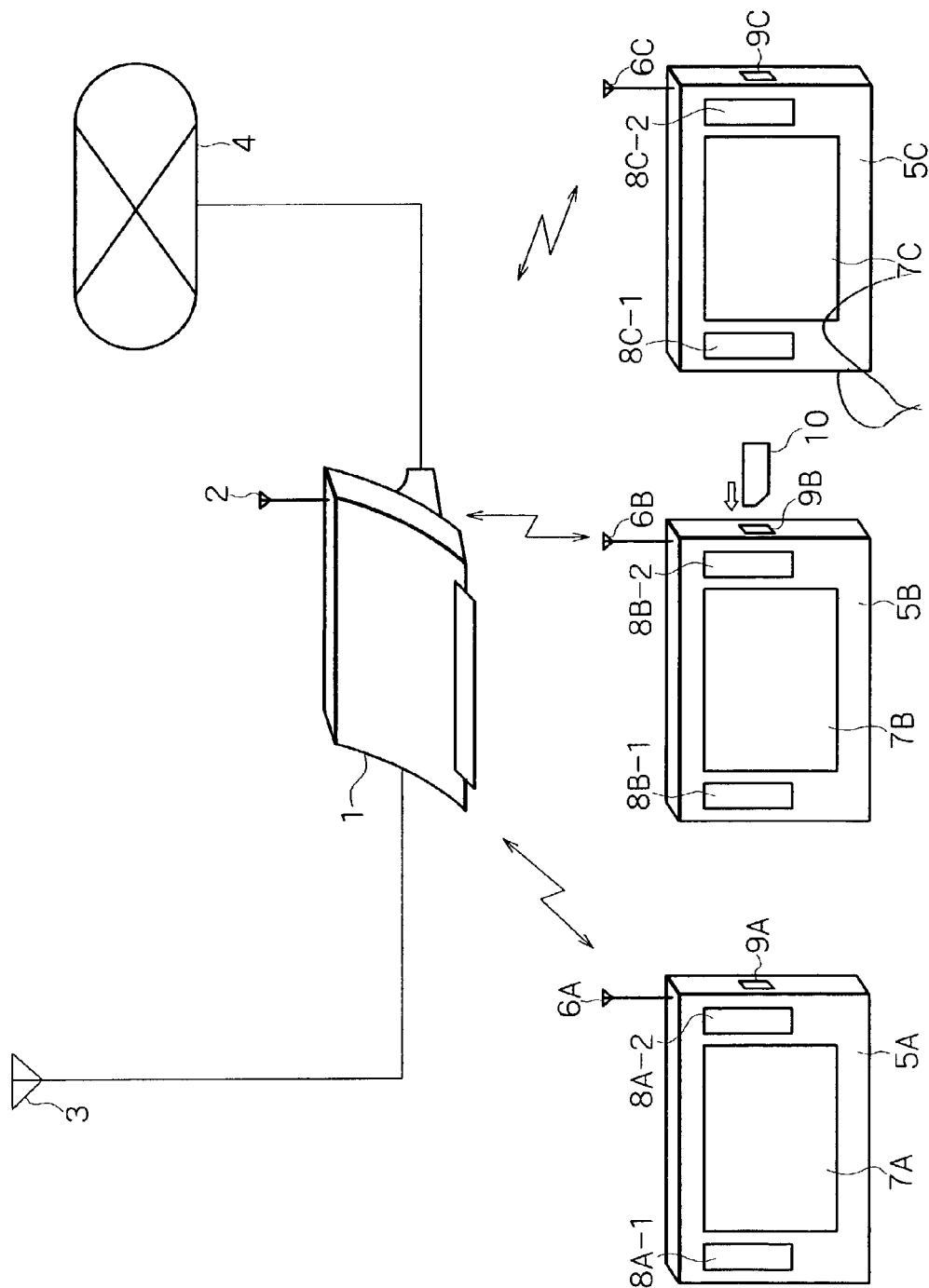
FIG. 1 is a diagram showing an example of configuration of a communication system to which the present invention is applied.

FIG. 1 is a diagram showing an example of configuration of a communication system to which the present invention is applied.

A base station 1 has a communication antenna 2, and can thereby communicate by radio with each of a display apparatus 5A provided with a communication antenna 6A, a display apparatus 5B provided with a communication antenna 6B, and a display apparatus 5C provided with a communication antenna 6C. (When each of the display apparatus 5A to 5C does not need to be individually differentiated from the others, the display apparatus 5A to 5C will hereinafter be referred to collectively as a display apparatus 5. The same applies to other constituent parts.)

The base station 1 is connected with a television broadcast receiving antenna 3. Thus, in response to a specification by a user of a channel to be selected, the base station 1 can extract a program signal from television broadcast waves received by the television broadcast receiving antenna 3. The extracted program signal is compressed by a compression method conforming to MPEG (Moving Picture Experts Group) 2, for example, transmitted from the communication antenna 2 to the display apparatus 5, and then outputted to a display unit 7 and speakers 8-1 and 8-2 provided to the display apparatus 5. The user can thereby view the television program while holding the display apparatus 5 and moving freely.

The base station 1 is also connected with the Internet 4 formed by a public line network and the like. Thus, in response to notification from the display apparatus 5 via the communication antenna 2 of a URL (Uniform Resource Locator) inputted by the user, the base station 1 accesses a not shown WWW (World Wide Web) server connected to the Internet 4 and specified by the URL, and thereby obtains a Web page described in HTML (Hyper Text Markup Language), for example. The obtained Web page is compressed by a predetermined compression method, transmitted from the communication antenna 2 to the display apparatus 5, and then displayed on the display unit 7. The user can thereby use various contents on the Internet 4 by means of the display apparatus 5 while moving freely, as in the case of viewing the television program. The user can also use the display apparatus 5 to send and receive e-mail to and from an information processing apparatus such as a personal computer connected to the Internet 4.

Each of the display apparatus 5 is provided with a memory card slot 9 so that a removable memory card 10 can be inserted into the memory card slot 9. The memory card 10 has a nonvolatile flash memory therein, and can store various information. The user can for example store a picture taken by a digital camera on the memory card 10, insert the memory card 10 into the memory card slot 9, and thereby display the taken picture on the display unit 7. The user can also store on the memory card 10 a desired moment of a program displayed on the display unit 7, and later reproduce the moment on the display unit 7.

In addition, the user can use the memory card 10 to install various programs stored thereon in the display apparatus 5. For example, the user can use an upgrade program stored on the memory card 10 as a control program compatible with various data currently used in the display apparatus 5 to upgrade a WWW browser program or the like stored in the display apparatus 5.

In the communication system of FIG. 1, when the user has upgraded a program stored in the display apparatus 5B using the memory card 10, for example, an upgrade program for the base station 1 corresponding to the program stored in the display apparatus 5B is read from the memory card 10, and then transmitted from the display apparatus 5B to the base station 1. In response to the transmitted upgrade program, the base station 1 upgrades a program stored therein (currently used program).

In the communication system of FIG. 1, the upgrade program (the same program as the program installed in the display apparatus 5B) for programs stored in the other display apparatus 5 (the display apparatus 5A and 5C in the above case) is transmitted to the base station 1 in conjunction with the upgrade program for the base station 1, and then transmitted from the base station 1 to the display apparatus 5A and 5C. Then, the display apparatus 5A and 5C also upgrade the currently used program by the upgrade program received by the display apparatus 5A and 5C. Thus, by installing the upgrade program in one of the display apparatus 5, the user can upgrade the program of the other display apparatus 5.

In addition, the user can make a setting to prohibit the currently used program in each of the display apparatus 5 from being upgraded by the upgrade program transmitted from the base station 1. The user can thereby prevent the program that has been used and various settings related to operation from being updated automatically.

Figure 2:
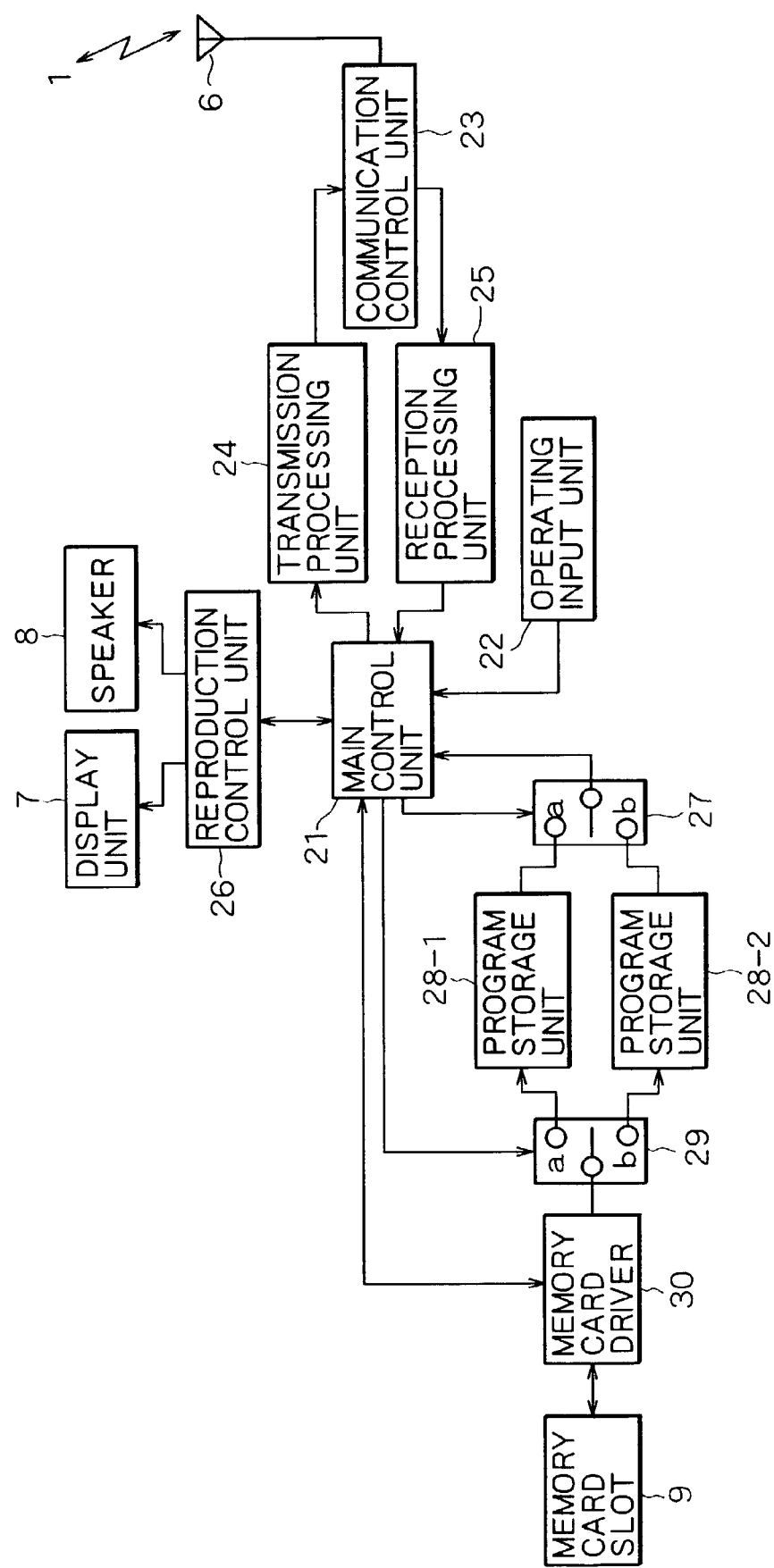
FIG. 2 is a block diagram showing an example of an internal configuration of a display apparatus in FIG. 1.

FIG. 2 is a block diagram showing an example of an internal configuration of the display apparatus 5 in FIG. 1.

According to various instructions inputted by operation of an operating input unit 22 by the user, a main control unit 21 unfolds, in a RAM (Random Access Memory) not shown in the figure, a control program stored in a built-in ROM (Read Only Memory) not shown in the figure, or a program storage unit 28-1 or 28-2. The main control unit 21 thus controls operation of the whole of the display apparatus 5.

The operating input unit 22 is formed of various buttons, and notifies various input information inputted from the user to the main control unit 21. The operating input unit 22 also has a function of a touch panel laminated on the display unit 7; the operating input unit 22 generates input information in response to the touching with the hand of the user of various buttons displayed on the display unit 7, and then supplies the input information to the main control unit 21. In addition, the display apparatus 5 is provided with a touch pen for inputting various information, and the operating input unit 22 supplies the main control unit 21 with text data as e-mail inputted from the touch pen, for example.

A communication control unit 23 transmits a signal supplied from a transmission processing unit 24 to the base station 1 via the communication antenna 6. The communication control unit 23 also receives a signal transmitted from the base station 1 via the communication antenna 6, and then supplies the signal to a reception processing unit 25.

The transmission processing unit 24 subjects the text data as e-mail, for example, supplied from the main control unit 21 to digital-to-analog conversion, modulation processing and the like, and then supplies a resulting analog signal to the communication control unit 23.

The reception processing unit 25 subjects the analog signal supplied from the communication control unit 23 to amplification, demodulation, analog-to-digital conversion processing and the like, and then supplies resulting digital data to the main control unit 21. For example, the reception processing unit 25 supplies the main control unit 21 with television program data in a compressed state obtained after subjecting a television program signal supplied from the communication control unit 23 to the various processing.

A reproduction control unit 26 reproduces data supplied from the main control unit 21 for display on the display unit 7 or output to the speaker 8. The reproduction control unit 26 for example decodes the television program data supplied from the main control unit 21 in a state of being compressed in a format conforming to MPEG2, for example, and then displays a resulting video signal on the display unit 7 and outputs a resulting audio signal to the speaker 8. The reproduction control unit 26 also performs processing such as displaying a Web page supplied from the main control unit 21 on the display unit 7.

A selector switch 27 selects a control program to be supplied to the main control unit 21 from a control program stored by the program storage unit 28-1 and a control program stored by the program storage unit 28-2 according to an instruction from the main control unit 21.

A selector switch 29 selects the program storage units 28-1 and 28-2 into which an upgrade program supplied from a memory card driver 30 is to be installed, according to an instruction from the main control unit 21. The selector switch 29 is for example alternately turned to an a side (program storage unit 28-1 side) and a b side (program storage unit 28-2 side) in FIG. 2 to upgrade the stored control program each time an upgrade program is supplied. That is, the older of the control programs stored in the program storage unit 28-1 and the program storage unit 28-2 is upgraded (rewritten)Incidentally, the user may be allowed to select where to install a control program.

The memory card driver 30 reads and writes various data from and to the memory card 10 inserted in the memory card slot 9. For example, the memory card driver 30 reads the control program stored on the memory card 10 according to an instruction from the main control unit 21, and then supplies the control program to the selector switch 29.

Figure 3:
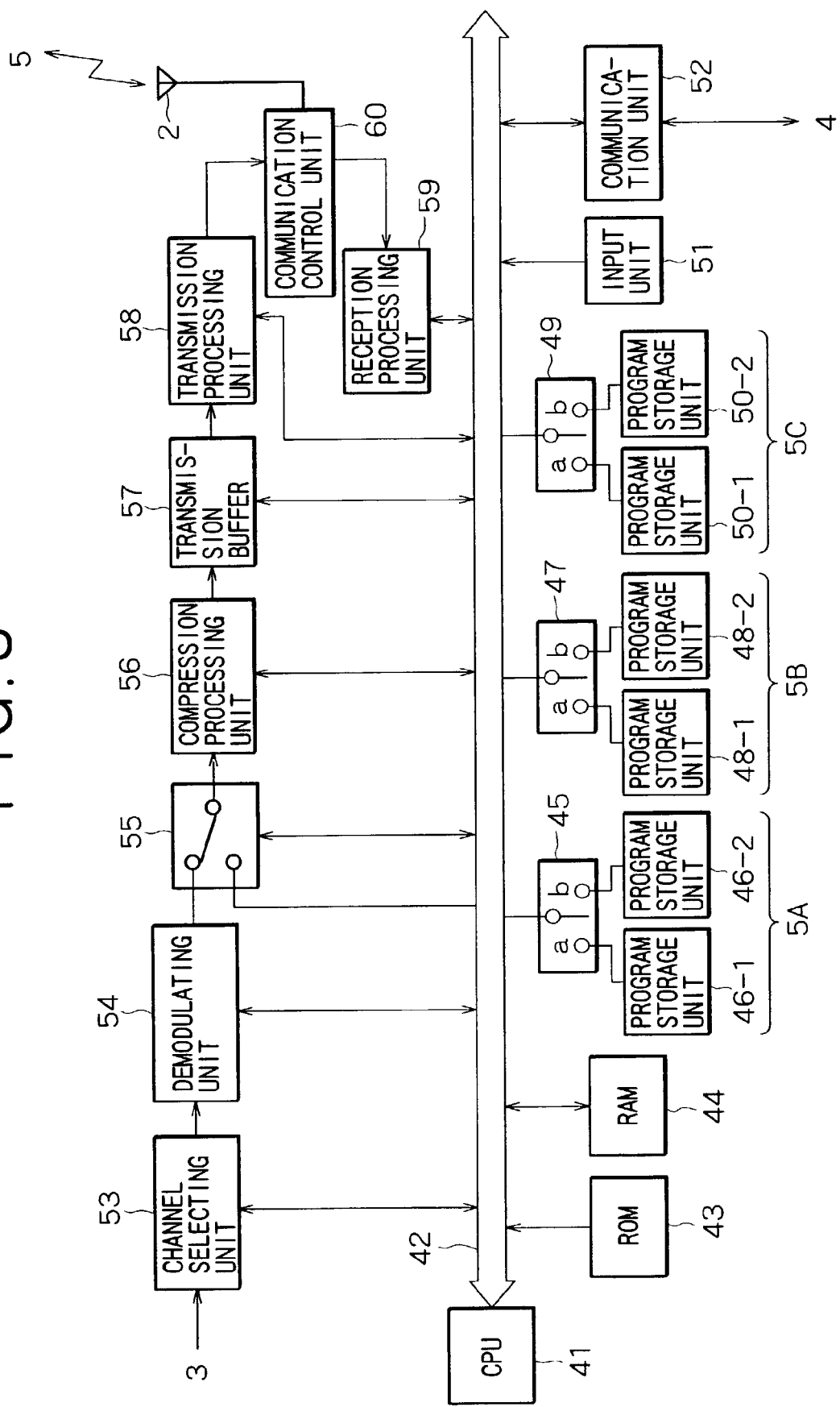
FIG. 3 is a block diagram showing an example of an internal configuration of a base station in FIG. 1.

FIG. 3 is a block diagram showing an example of an internal configuration of the base station 1.

A CPU 41 controls operation of each part connected to the CPU 41 via a bus 42 according to an instruction inputted from the user by operating an input unit 51 and an instruction transmitted from the display apparatus 5 via the communication antenna 2.

A ROM 43 stores programs for controlling fundamental operation and the like among control programs used by the CPU 41. A RAM 44 temporarily stores a program used by the CPU 41 and various data generated when processing is performed.

Program storage units 46-1 and 46-2 store a control program in a version corresponding to that of a control program stored in the program storage units 28-1 and 28-2, respectively, of the display apparatus 5A. Thus, when the control program of the program storage unit 28-1 is started by the main control unit 21 in the display apparatus 5A, for example, the CPU 41 starts the control program stored in the program storage unit 46-1 to communicate with the display apparatus 5A.

Similarly, program storage units 48-1 and 48-2 store a control program in a version corresponding to that of a control program stored in the program storage units 28-1 and 28-2, respectively, of the display apparatus 5B. Program storage units 50-1 and 50-2 store a control program in a version corresponding to that of a control program stored in the program storage units 28-1 and 28-2, respectively, of the display apparatus 5C.

As described later, when the display apparatus 5 upgrades the control program of either one of the program storage units 28-1 and 28-2, the control program stored in the corresponding program storage unit of the base station 1 is also upgraded.

Selector switches 45, 47, and 49 select the program storage units for reading and writing the control programs according to an instruction from the CPU 41.

The input unit 51 sends input information inputted by operating a button by the user to the CPU 41 via the bus 42.

A communication unit 52 is formed by a modem, a terminal adapter and the like, and sends and receives information to and from various information processing apparatus connected to the Internet 4.

A channel selecting unit 53 extracts a specified program signal from television broadcast waves received by the television broadcast receiving antenna 3 according to an instruction from the CPU 41. The extracted program signal is supplied to a demodulating unit 54, subjected to demodulation processing, amplification processing, analog-to-digital conversion processing and the like, and then supplied to a selector switch 55.

The selector switch 55 selects data to be transmitted to the display apparatus 5 from the television program data supplied to the selector switch 55 from the demodulating unit 54 and an HTML file supplied to the selector switch 55 via the bus 42 according to an instruction from the CPU 41, and then supplies the data to a compression processing unit 56. When the display apparatus 5A requests reproduction of a television program and the display apparatus 5B requests display of a Web page, for example, the CPU 41 drives the selector switch 55 so as to respond to the requests.

The compression processing unit 56 subjects the television program data supplied from the selector switch 55 and the HTML file supplied from the communication unit 52 via the bus 42 to compression processing by a predetermined method, and then supplies resulting data to a transmission buffer 57. The transmission buffer 57 supplies the data supplied from the compression processing unit 56 to a transmission processing unit 58 according to an instruction for timing from the CPU 41.

The transmission processing unit 58 supplies a communication control unit 60 with a signal obtained by subjecting the data supplied from the transmission buffer 57 to modulation, digital-to-analog conversion processing and the like. The communication control unit 60 then transmits the data supplied from the transmission processing unit 58 from the communication antenna 2 to the display apparatus 5 requesting the data.

A reception processing unit 59 sends, to the CPU 41 via the bus 42, data obtained by subjecting a signal of a URL of a WWW server to be accessed, for example, the signal having being received from the display apparatus 5 by the communication control unit 60 via the communication antenna 2, to demodulation processing and the like.

Operation of the communication system in FIG. 1 will next be described with reference to flowcharts of FIGS. 4 to 7. First, processing of the display apparatus 5 for upgrading a program will be described with reference to the flowchart of FIG. 4.

At a step S1, the main control unit 21 determines on the basis of input information from the operating input unit 22 whether an instruction for upgrading a control program is provided from the user. The main control unit 21 stands by until the main control unit 21 determines that the instruction is provided from the user.

When the user inserts the memory card 10 having an upgrade program stored thereon into the memory card slot 9 and performs a predetermined input operation from the operating input unit 22, the main control unit 21 determines that the instruction for upgrade is provided, and then proceeds to a step S2.

At the step S2, the main control unit 21 determines whether processing of upgrading the control program has been performed in the past. On the basis of results of determination at the step S2 and a step S4, the main control unit 21 selects the program storage unit 28-1 or 28-2 having the older-version control program stored therein, and overwrites the older-version control program with the upgrade program provided via the memory card 10.

Thus, when the main control unit 21 determines at the step S2 that the upgrade processing has not been performed in the past, the main control unit 21 proceeds to a step S3 to read the upgrade program by controlling the memory card driver 30, drive the selector switch 29 to the switch b side (program storage unit 28-2 side), and thereby install the upgrade program in the program storage unit 28-2. That is, in this case, the program storage unit 28-1 stores a first control program (control program used in an initial state), and the program storage unit 28-2 does not store anything. Thus, the version of the control program stored in the program storage unit 28-2 becomes newer than the version of the control program stored in the program storage unit 28-1.

When the main control unit 21 determines at the step S2 that the upgrade processing has been performed in the past, on the other hand, the main control unit 21 compares the version of the control program stored in the program storage unit 28-1 with the version of the control program stored in the program storage unit 28-2. The main control unit 21 then determines at the step S4 whether the control program stored in the program storage unit 28-1 is newer than the control program stored in the program storage unit 28-2.

When the main control unit 21 determines at the step S4 that the control program stored in the program storage unit 28-1 is newer than the control program stored in the program storage unit 28-2, the main control unit 21 proceeds to the step S3 and installs the control program stored on the memory card 10 into the program storage unit 28-2 so as to upgrade the older-version control program.

On the other hand, when the main control unit 21 determines at the step S4 that the control program stored in the program storage unit 28-1 is older than the control program stored in the program storage unit 28-2, the main control unit 21 proceeds to a step S5 to drive the selector switch 29 to the a side and install the control program stored on the memory card 10 into the program storage unit 28-1.

After the processing of upgrading the control program is performed at the step S3 or the step S5, the processing proceeds to a step S6. At the step S6, in order to upgrade also the control programs of the base station 1 and the other display apparatus 5 (display apparatus 5B and 5C when the memory card 10 is inserted into the display apparatus 5A and the upgrade processing is performed therein), the main control unit 21 reads from the memory card 10 the same control program as the control program installed at the step S3 or S5 and a control program for the base station 1 corresponding to the version of the same control program as the control program installed at the step S3 or S5. The read control programs are subjected to modulation, digital-to-analog conversion processing and the like by the transmission processing unit 24 and the communication control unit 23, and then transmitted from the communication antenna 6 to the base station 1. Thereafter, the processing is ended.

As a result of the above processing, the control programs are stored in the program storage units 28-1 and 28-2. Therefore, even if the upgrade processing is not completed properly, the main control unit 21 can start the older-version control program to perform various processing.

Figure 5:
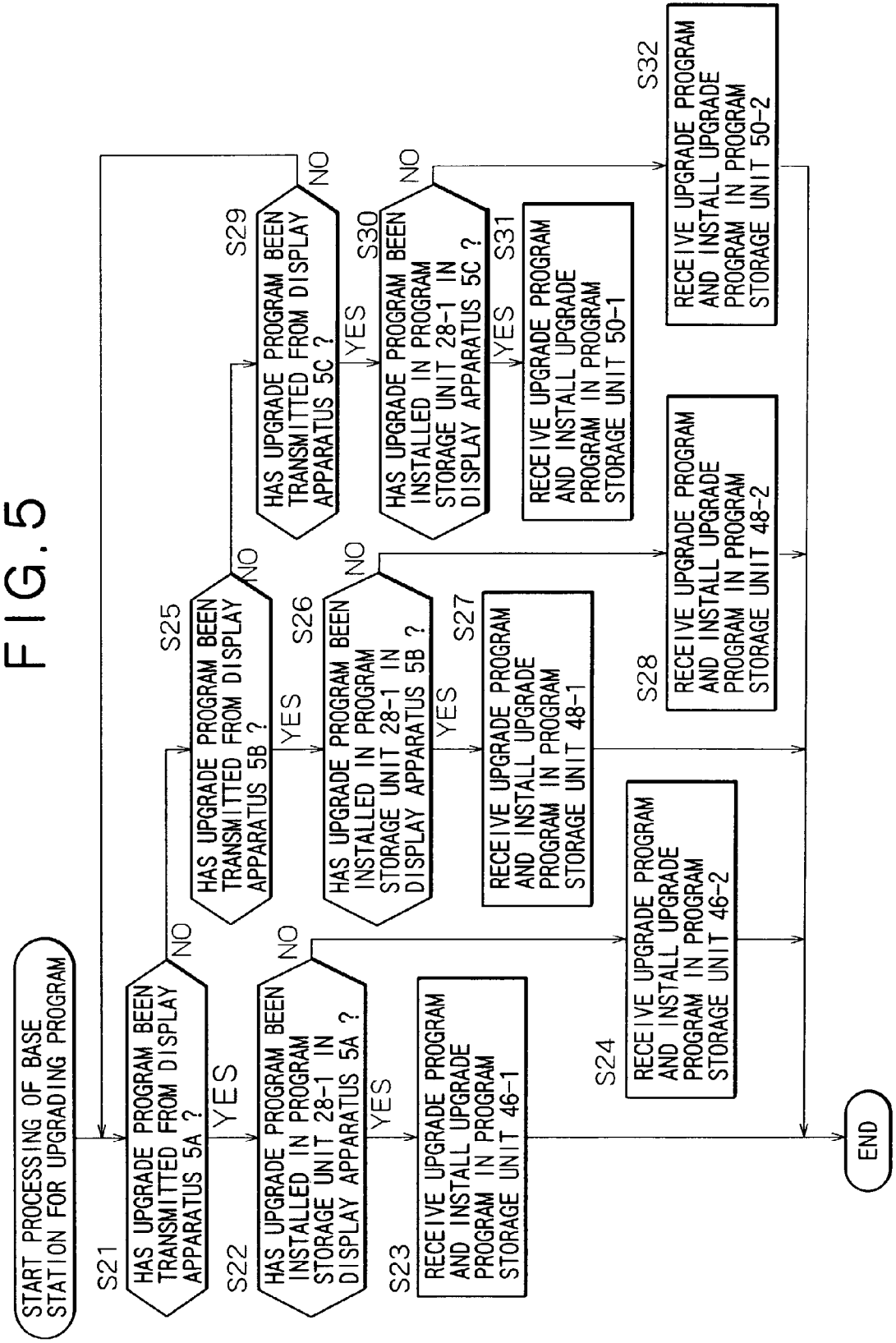
FIG. 5 is a flowchart of assistance in explaining processing of the base station in FIG. 1.

Processing of the base station 1 for upgrading a control program will next be described with reference to the flowchart of FIG. 5.

At a step S21, the CPU 41 determines whether an upgrade program has been transmitted to the base station 1 from the display apparatus 5A. That is, the CPU 41 determines whether the processing described with reference to FIG. 4 has been performed in the display apparatus 5A. When the CPU 41 determines that the upgrade program received by the communication antenna 2, subjected to amplification, demodulation, analog-to-digital conversion processing and the like by the reception processing unit 59, and transmitted to the CPU 41 via the bus 42 has been transmitted to the base station 1 from the display apparatus 5A, the CPU 41 proceeds to a step S22.

At a step S22, the CPU 41 determines whether an upgrade program has been installed in the program storage unit 28-1 in the display apparatus 5A.

When the CPU 41 determines at the step S22 that the upgrade program provided via the memory card 10 has been installed in the program storage unit 28-1 in the display apparatus 5A, the CPU 41 proceeds to a step S23 to receive the transmitted control program for the base station 1 and then install the control program in the program storage unit 46-1. The selector switch 45 turns the switch to the a side (program storage unit 46-1 side) according to an instruction from the CPU 41 to install the upgrade program supplied from the reception processing unit 59 into the program storage unit 46-1.

On the other hand, when the CPU 41 determines at the step S22 that the upgrade program provided via the memory card 10 has not been installed in the program storage unit 28-1 (has been installed in the program storage unit 28-2) in the display apparatus 5A, the CPU 41 proceeds to a step S24. At the step S24, the CPU 41 drives the selector switch 45 to the b side (program storage unit 46-2 side) to install the upgrade program supplied from the reception processing unit 59 into the program storage unit 46-2.

As a result of the above processing, the control program for the base station 1 is stored so that the version of the control program installed in the display apparatus 5A corresponds to the version of the control program for the base station 1. When the control program stored in the program storage unit 28-1 is started in the display apparatus 5A, for example, the base station 1 starts the control program stored in the program storage unit 46-1.

On the other hand, when the CPU 41 determines at the step S21 that the upgrade program has not been transmitted from the display apparatus 5A, the CPU 41 proceeds to a step S25.

At the step S25, the CPU 41 determines whether the upgrade program has been transmitted from the display apparatus 5B. When the CPU 41 determines that the upgrade program has been transmitted from the display apparatus 5B, the CPU 41 performs basically the same processing at steps S26 to S28 as that of the foregoing steps S22 to S24.

Specifically, the CPU 41 determines at the step S26 whether the upgrade program has been stored in the program storage unit 28-1 as a result of performing the processing described with reference to FIG. 4 in the display apparatus 5B. When the CPU 41 determines that the upgrade program provided via the memory card 10 has been installed in the program storage unit 28-1 in the display apparatus 5B, the CPU 41 stores the transmitted upgrade program for the base station 1 in the program storage unit 48-1 at the step S27. On the other hand, when the CPU 41 determines that the upgrade program provided via the memory card 10 has been installed in the storage unit 28-2 in the display apparatus 5B, the CPU 41 installs the transmitted upgrade program for the base station 1 in the program storage unit 48-2.

When the CPU 41 determines at the step S25 that the upgrade program has not been transmitted from the display apparatus 5B, the CPU 41 proceeds to a step S29.

At the step S29, the CPU 41 determines whether the upgrade program has been transmitted from the display apparatus 5C. When the CPU 41 determines that the upgrade program has not been transmitted from the display apparatus 5C, the CPU 41 returns to the step S21 and repeats the processing from the step S21 on down.

On the other hand, when the CPU 41 determines at the step S29 that the upgrade program has been transmitted from the display apparatus 5C, the CPU 41 performs basically the same processing at steps S30 to S32 as that of the foregoing steps S22 to S24 and that of the foregoing steps S26 to S28.

Specifically, the CPU 41 determines at the step S30 whether the upgrade program has been stored in the program storage unit 28-1 as a result of performing the processing described with reference to FIG. 4 in the display apparatus 5C. When the CPU 41 determines that the upgrade program provided via the memory card 10 has been installed in the program storage unit 28-1 in the display apparatus 5C, the CPU 41 stores the transmitted upgrade program for the base station 1 in the program storage unit 50-1 at the step S31. On the other hand, when the CPU 41 determines that the upgrade program provided via the memory card 10 has been installed in the storage unit 28-2 in the display apparatus 5C, the CPU 41 installs the transmitted upgrade program for the base station 1 in the program storage unit 50-2 at the step S32.

As a result of the above processing, the control program in the same version is also installed in the base station 1.

Figure 6:
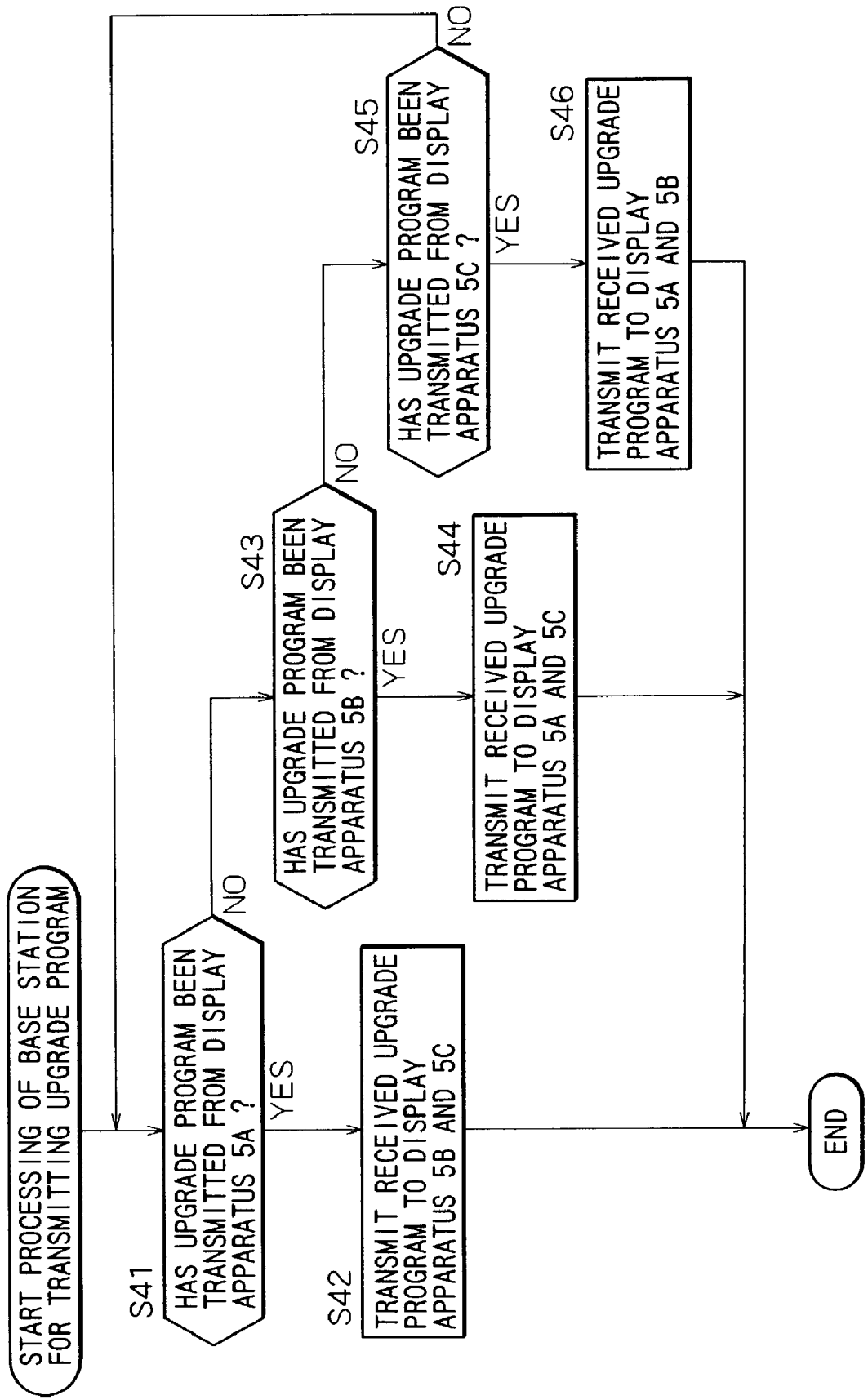
FIG. 6 is a flowchart of assistance in explaining other processing of the base station in FIG. 1.

Processing of the base station 1 for transmitting an upgrade program to display apparatus 5 that have not upgraded the control program will next be described with reference to the flowchart of FIG. 6.

At a step S41, the CPU 41 determines whether or not an upgrade program has been transmitted to the base station 1 from the display apparatus 5A. That is, the CPU 41 determines whether or not the processing described with reference to FIG. 4 has been performed in the display apparatus 5A and the same control program as the control program installed therein has been transmitted at the step S6 in FIG. 4. When the CPU 41 determines that an upgrade program has been transmitted from the display apparatus 5A, the CPU 41 proceeds to a step S42.

At the step S42, the CPU 41 transmits the received upgrade program (control program installed in the display apparatus 5A) to the display apparatus 5B and 5C. The upgrade program of the display apparatus 5 received by the communication antenna 2 is subjected to various processing by the reception processing unit 59, and then supplied to the compression processing unit 56 via the bus 42 and the selector switch 55. Control program data obtained after the compression processing unit 56 subjects the upgrade program to predetermined compression processing is supplied to the transmission buffer 57, and then supplied to the transmission processing unit 58 according to an instruction for timing from the CPU 41. The control program data is subjected to modulation and digital-to-analog conversion processing by the transmission processing unit 58, and then transmitted from the communication control unit 60 to the display apparatus 5B and 5C via the communication antenna 2.

On the other hand, when the CPU 41 determines at the step S41 that the upgrade program has not been transmitted from the display apparatus 5A, the CPU 41 proceeds to a step S43.

At the step S43, the CPU 41 determines whether or not the upgrade program has been transmitted from the display apparatus 5B. When the CPU 41 determines that the upgrade program has been transmitted from the display apparatus 5B, the CPU 41 proceeds to a step S44. At the step S44, the same processing as at the foregoing step S42 is performed to transmit the received upgrade program of the display apparatus 5 to the display apparatus 5A and 5C.

When the CPU 41 determines at the step S43 that the upgrade program has not been transmitted from the display apparatus 5B, the CPU 41 proceeds to a step S45.

At the step S45, the CPU 41 determines whether or not the upgrade program has been transmitted from the display apparatus 5C. When the CPU 41 determines that the upgrade program has not been transmitted from the display apparatus 5C, the CPU 41 returns to the step S41 and repeats the processing from the step S41 on down.

On the other hand, when the CPU 41 determines at the step S45 that the upgrade program has been transmitted from the display apparatus 5C, the CPU 41 proceeds to a step S46, and the same processing as at the foregoing steps S42 and S44 is performed. Specifically, the received upgrade program of the display apparatus 5 is transmitted to the display apparatus 5A and 5B.

Figure 7:
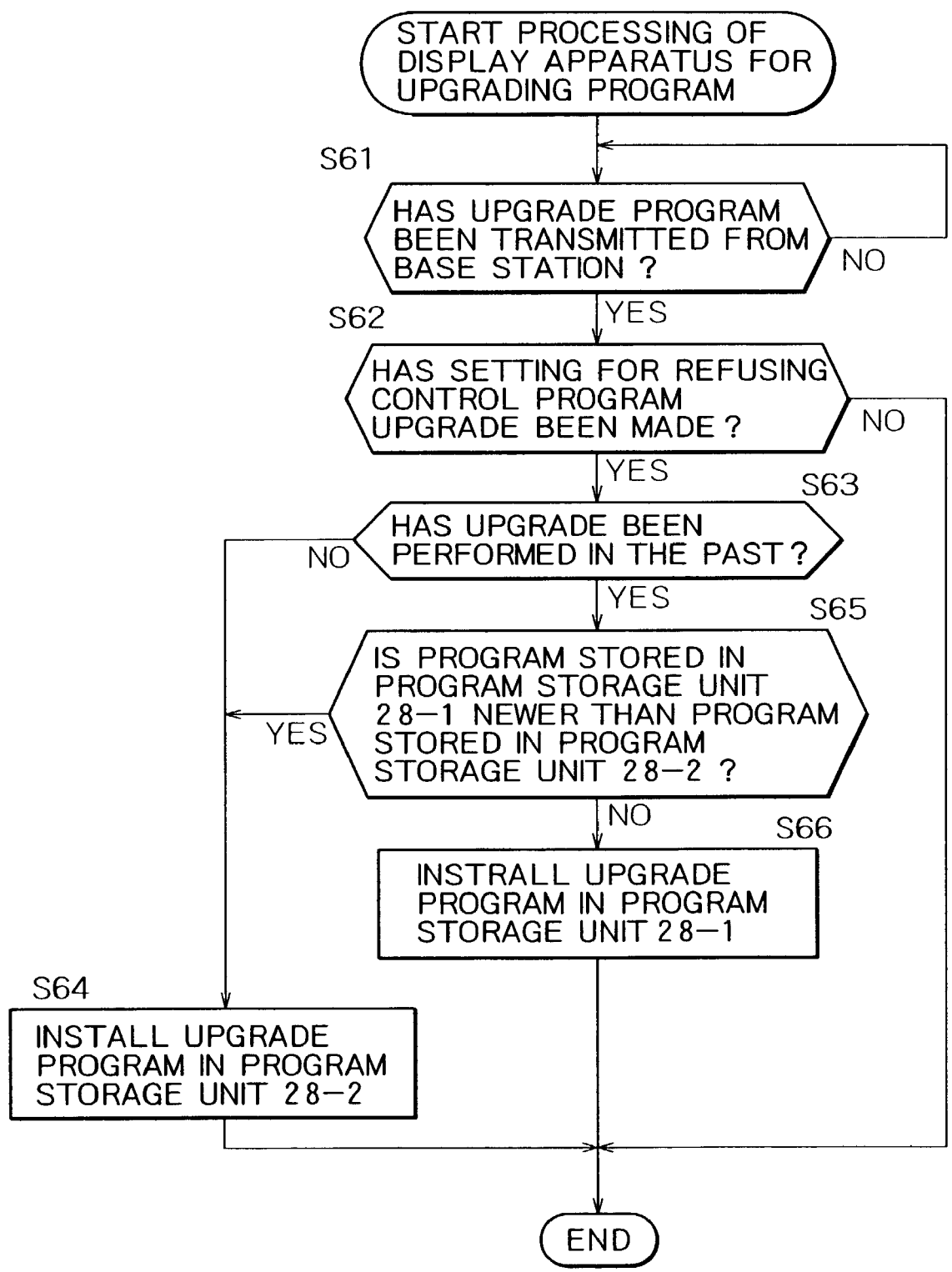
FIG. 7 is a flowchart of assistance in explaining other processing of the display apparatus in FIG. 1.

Processing of the display apparatus 5 for upgrading by a control program transmitted from the base station 1 will next be described with reference to the flowchart of FIG. 7. This processing is performed in the display apparatus 5 that have not upgraded a control program via the memory card 10. When the control program of the display apparatus 5B is upgraded via the memory card 10 as shown in FIG. 1, for example, the processing is performed in the display apparatus 5A and 5C.

At a step S61, the main control unit 21 determines whether or not an upgrade program has been transmitted to the display apparatus 5 from the base station 1. The main control unit 21 stands by until the main control unit 21 determines that an upgrade program has been transmitted to the display apparatus 5.

When the main control unit 21 determines at the step S61 that an upgrade program has been transmitted from the base station 1, the main control unit 21 proceeds to a step S62. The upgrade program transmitted from the base station 1 is received by the communication antenna 6, subjected to demodulation processing, analog-to-digital conversion processing and the like by the communication control unit 23 and the reception processing unit 25, and then supplied to the main control unit 21.

At the step S62, the main control unit 21 determines whether or not a setting for refusing control program upgrade has been made. Specifically, as described above, the user can make a setting in the display apparatus 5 used by the user himself/herself to refuse control program upgrade by the upgrade program transmitted from the base station 1. Therefore, when the main control unit 21 determines that a setting for refusing control program upgrade has been made by a flag in a memory not shown in the figure or the like, the main control unit 21 ends the processing.

Figure 4:
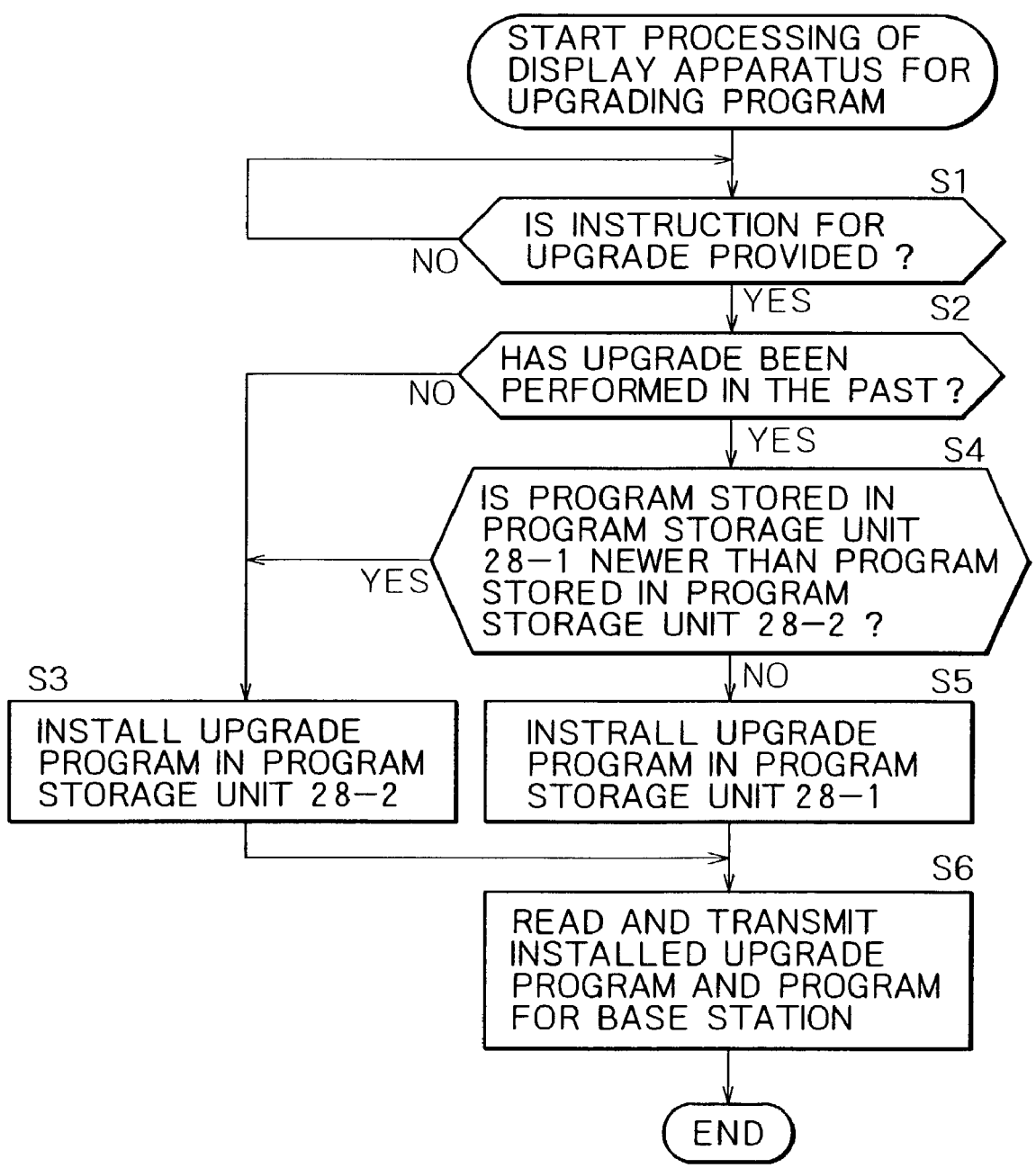
FIG. 4 is a flowchart of assistance in explaining processing of the display apparatus in FIG. 1.

On the other hand, when the main control unit 21 determines at the step S62 that no setting for refusing control program upgrade has been made, the main control unit 21 proceeds to a step S63 to perform the same processing at steps S63 to S66 as at the steps S2 to S5 in FIG. 4. Specifically, when the main control unit 21 determines at the step S63 that upgrade has not been performed in the past, no control program is stored in the program storage unit 28-2, and therefore the upgrade program transmitted from the base station 1 is installed in the program storage unit 28-2 at the step S64.

When the main control unit 21 determines at the step S63 that upgrade has been performed in the past, on the other hand, the main control unit 21 determines at the step S65 which of the control programs stored in the program storage units 28-1 and 28-2 is the newer version. According to a result of the determination, the upgrade program transmitted from the base station 1 is installed in the program storage unit that stores the older-version control program at the step S64 or S66.

With the above processing, even when a plurality of display apparatus 5 are connected to the base station 1, it is not necessary to insert the memory card 10 into each of the display apparatus 5 to install the control program. In addition, since a version of the control program that has been previously used is stored, a situation where the display apparatus 5 cannot be used is prevented even if it is not possible to execute the upgraded control program properly.

Figure 8:
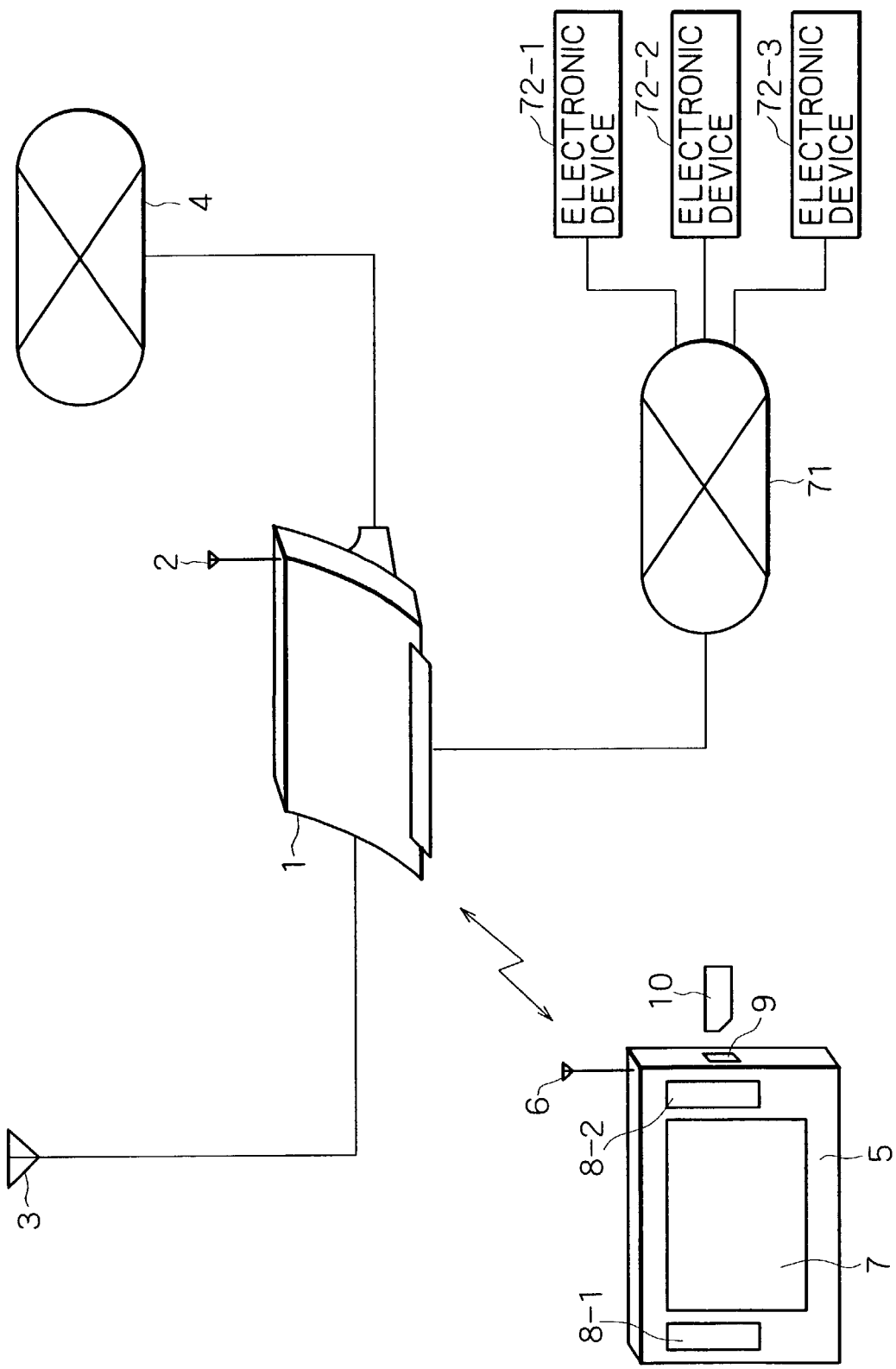
FIG. 8 is a diagram showing an example of configuration of another communication system to which the present invention is applied.

FIG. 8 is a diagram showing an example of configuration of another communication system to which the present invention is applied.

In this example, a base station 1 is connected with a home network 71 formed by a LAN (Local Area Network), for example. Also, the home network 71 is connected with electronic devices 72-1 to 72-3, so that the electronic devices 72-1 to 72-3 can transmit and receive data to and from each other.

Hence, when a control program of a display apparatus 5 is upgraded via a memory card 10, not only are control programs of the base station 1 and other display apparatus 5 upgraded, but also an upgrade program for the electronic devices 72-1 to 72-3 connected to the home network 71 is read from the memory card 10 and installed in the electronic devices 72-1 to 72-3.

Thus, in addition to the upgrading of control programs of the base station 1 and the display apparatus 5, the present invention is applicable to various electronic devices.

In the example described above, when each electronic device can store a plurality of versions of a control program, a new version of the control program is installed alternately in two program storage units 28-1 and 28-2. However, three or more program storage units may be provided, and the user may be allowed to select a program storage unit for installation.

The series of processing steps described above may be carried out not only by hardware but also by software.

When the series of processing steps is to be carried out by software, a program forming the software is installed from a network or a recording medium into a general-purpose personal computer 81 as shown in FIG. 9, for example, and provided to the base station 1 or the display apparatus 5 via the memory card 10 or the like. The program may be installed in the base station 1 directly from the Internet 4 as a network.

As shown in FIG. 9, the recording medium is not only formed by packaged media distributed to users to provide the program separately from the apparatus proper, the packaged media being formed by a magnetic disk 101 (including a floppy disk), an optical disk 102 (including CD-ROM (Compact Disk-Read Only Memory) and DVD (Digital Versatile Disk)), a magneto-optical disk 103 (including MD (Mini-Disk)), the memory card 10 or the like having the program recorded thereon, but also formed by a ROM 92, a hard disk included in a storage unit 98 or the like which has the program recorded thereon and is supplied to the user in a state of being preincorporated in the apparatus proper.

It is to be noted that in the present specification, the steps describing the program recorded on the recording medium include not only processing carried out in time series in the described order but also processing carried out in parallel or individually and not necessarily in time series.

Also, in the present specification, a system represents an apparatus as a whole formed by a plurality of apparatus.

INDUSTRIAL APPLICABILITY

As described above, according to the present invention, it is possible to readily upgrade software of information processing apparatus connected by a network without using a recording medium.

What is claimed is:

1. An information processing terminal comprising:
communicating means for communicating with an information processing apparatus by radio;
storing means for storing a first control program; and
control program rewriting means for rewrites said first control program stored by said storing means in accordance with a status of a user set setting,
wherein said control program rewriting means rewrites said first control program stored in said storing means on the basis of a new said first control program,
wherein said user set setting is a setting relating to the operation of said first control program that allows a user to block said control program rewriting means from rewriting said first control program, and
wherein said communicating means transmits a second control program stored on said recording medium to said information processing apparatus to upgrade an old said second control program.

2. An information processing terminal as set forth in claim 1, wherein said communicating means transmits to said information processing apparatus said second control program for said information processing apparatus corresponding to said first control program obtained by the rewriting of said control program rewriting means.

3. An information processing terminal as set forth in claim 1, wherein said storing means can store a plurality of said first control programs; and
wherein said control program rewriting means rewrites only one of the plurality of said first control programs.

4. An information processing method comprising:
a communicating step for communicating with an information processing apparatus by radio;
a storing step for storing a first control program; and a control program rewriting step for rewriting said first control program stored by processing of said storing step in accordance with a status of a user set setting, wherein processing of said control program rewriting step rewrites said first control program stored by the processing of said storing step on the basis of a new said first control program, wherein said user set setting is a setting relating to the operation of said first control program that allows a user to block said control program rewriting means from rewriting said first control program, and wherein processing of said communicating step transmits a second control program stored on said recording medium to said information processing apparatus to upgrade an old said second control program.

5. A recording medium having a computer readable program recorded thereon, said program comprising:

a communicating step for communicating with an information processing apparatus by radio;

a storing step for storing a first control program; and a control program rewriting step for rewriting said first control program stored by processing of said storing step in accordance with a status of a user set setting, wherein processing of said control program rewriting step rewrites said first control program stored by the processing of said storing step on the basis of a new said first control program, wherein said user set setting is a setting relating to the operation of said first control program that allows a user to block said control program rewriting means from rewriting said first control program, and wherein processing of said communicating step transmits a second control program stored on said recording medium to said information processing apparatus to upgrade an old said second control program.

6. An information processing terminal comprising:

communicating means for communicating with an information processing apparatus by radio;

storing means for storing a control program; and control program rewriting means for rewriting said control program stored by said storing means in accordance with a status of a user set setting, wherein said control program rewriting means rewrites said control program stored by said storing means on the basis of a new said control program obtained by said communicating means from said information processing apparatus, and wherein said user set setting is a setting relating to the operation of said control program that allows a user to block said control program rewriting means from rewriting said control program.

7. An information processing terminal as set forth in claim 6, wherein said storing means can store a plurality of said control programs; and wherein said control program rewriting means rewrites only one of the plurality of said control programs.

8. An information processing terminal as set forth in claim 6, wherein said communicating means obtains a new said control program transmitted from another information processing terminal to said information processing apparatus.

9. An information processing method comprising:

a communicating step for communicating with an information processing apparatus by radio;

a storing step for storing a control program; and a control program rewriting step for rewriting said control program stored by processing of said storing step in accordance with a status of a user set setting, wherein processing of said control program rewriting step rewrites said control program stored by the processing of said storing step on the basis of a new said control program obtained by processing of said communicating step from said information processing apparatus, and wherein said user set setting is a setting relating to the operation of said control program that allows a user to block said control program rewriting means from rewriting said control program.

10. A recording medium having a computer readable program recorded thereon, said program comprising:

a communicating step for communicating with an information processing apparatus by radio;

a storing step for storing a control program; and a control program rewriting step for rewriting said control program stored by processing of said storing step in accordance with a status of a user set setting, wherein processing of said control program rewriting step rewrites said control program stored by the processing of said storing step on the basis of a new said control program obtained by processing of said communicating step from said information processing apparatus, and wherein said user set setting is a setting relating to the operation of said control program that allows a user to block said control program rewriting means from rewriting said control program.

11. An information processing apparatus comprising:

communicating means for communicating with an information processing terminal by radio;

storing means for storing a first control program; and control program rewriting means for rewriting said first control program stored by said storing means on the basis of a second control program obtained by said communicating means from said information processing terminal in accordance with a status of a user set setting, wherein said user set setting is a setting relating to the operation of said first control program that allows a user to block said control program rewriting means from rewriting said first control program.

12. An information processing apparatus as set forth in claim 11, wherein when a plurality of said information processing terminals are provided, said communicating means transmits a control program obtained from a first said information processing terminal to a second information processing terminal to upgrade a control program of the second information processing terminal.

13. An information processing method comprising:

a communicating step for communicating with an information processing terminal by radio;

a storing step for storing a first control program; and a control program rewriting step for rewriting said first control program stored by processing of said storing step on the basis of a second control program obtained by processing of said communicating step from said information processing terminal in accordance with a status of a user set setting, wherein said user set setting is a setting relating to the operation of said first control program that allows a user to block said control program rewriting means from rewriting said first control program.

14. A recording medium having a computer readable program recorded thereon, said program comprising:

a communicating step for communicating with an information processing terminal by radio;

a storing step for storing a first control program; and a control program rewriting step for rewriting said first control program stored by processing of said storing step on the basis of a second control program obtained by processing of said communicating step from said information processing terminal in accordance with a status of a user set setting, wherein said user set setting is a setting relating to the operation of said first control program that allows a user to block said control program rewriting means from rewriting said first control program.

15. A communication system comprising an information processing terminal and an information processing apparatus said information processing terminal comprises:

first communicating means for communicating with said information processing apparatus by radio;

first storing means for storing a first control program; and first control program rewriting means for rewriting said first control program stored by said first storing means in accordance with a status of a user set setting, wherein said first control program rewriting means rewrites said first control program stored in said first storing means on the basis of a new said first control program, wherein said user set setting is a setting relating to the operation of said first control program that allows a user to block said control program rewriting means from rewriting said first control program, wherein said first communicating means transmits a new second control program stored on said recording medium to said information processing apparatus to upgrade an old said second control program; and said information processing apparatus comprises:

second communicating means for communicating with said information processing terminal by radio;

second storing means for storing said second control program; and second control program rewriting means for rewriting the old said second control program stored by said second storing means on the basis of the new said second control program obtained by said second communicating means from said information processing terminal.

16. A communication system comprising an information processing terminal and an information processing apparatus, said information processing terminal comprises:

first communicating means for communicating with said information processing apparatus by radio;

first storing means for storing a first control program; and control program rewriting means for rewriting said first control program stored by said first storing means in accordance with a status of a user set setting, wherein said control program rewriting means rewrites said control program stored by said first storing means on the basis of a new control program obtained by said first communicating means from said information processing apparatus, and wherein said user set setting is a setting relating to the operation of said first control program that allows a user to block said control program rewriting means from rewriting said first control program; and said information processing apparatus comprises:

second communicating means for communicating with said information processing terminal by radio and transmitting said new control program obtained from a first said information processing terminal to a second information processing terminal to upgrade a different control program of the second said information processing terminal.

* * * * *